July 14, 1953
N. TRBOJEVICH
2,645,026
ANGLE MEASURING BAR AND MICROMETER
Filed April 7, 1947
2 Sheets-Sheet 1
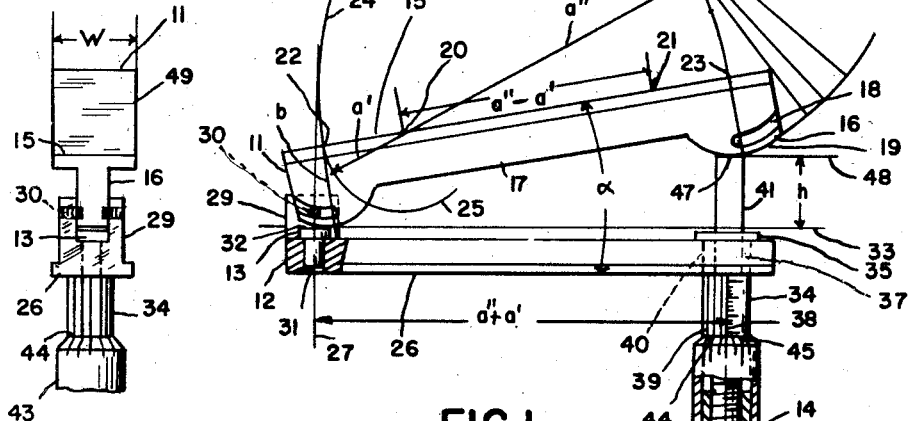
FIG.2.
FIG.1.
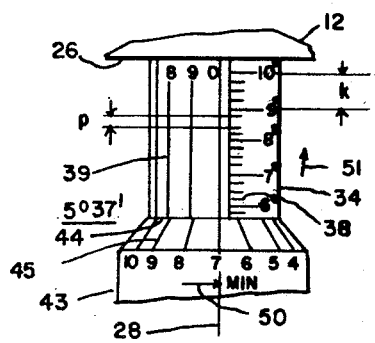
FIG.3.
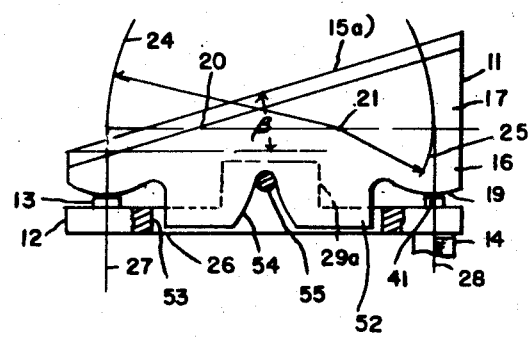
FIG.4.
INVENTOR.
NIKOLA TRBOJEVICH
BY
Whittemore Hulbert +Belknap
ATTORNEYS July 14, 1953     N. TRBOJEVICH     2,645,026
ANGLE MEASURING BAR AND MICROMETER
Filed April 7, 1947     2 Sheets—Sheet 2

INVENTOR.
NIKOLA TRBOJEVICH
BY
ATTORNEYS

Patented July 14, 1953

2,645,026

UNITED STATES PATENT OFFICE 2,645,026

ANGLE MEASURING BAR AND MICROMETER

Nikola Trbojevich, Detroit, Mich.

Application April 7, 1947, Serial No. 739,740

6 Claims. (Cl. 33—174)

The invention relates to an improvement in angle measuring bars and micrometers.

In particular, this application is a continuation in part of my previously filed and copending application Serial No. 579,789, filed February 26, 1945, now Patent No. 2,446,562, issued August 10, 1948, and entitled "Angle Measuring Bar and Gauges."

The principal object is to construct an angle measuring micrometer based upon the mathematical principles first disclosed in the aforesaid application.

Another object is to construct a simplified angle measuring bar which is particularly applicable to micrometers and other small and portable tools, as the second modification of this invention.

A further object is so to precalculate and correlate the length of the bar and the corresponding graduations in the barrel and thimble of the micrometer that accurate readings are readily obtained without any mathematical work.

Still another object is to design the instrument in such a manner that a standard micrometer screw may be used in its construction.

The basis of the invention is an angle rectifying bar as will be further explained.

In the drawings:

Fig. 1 is the elevation of the angle micrometer of the first type;

Fig. 2 is a side view of Fig. 1;

Fig. 3 is an enlarged detail view taken from Fig. 1;

Fig. 4 is a modified angle bar showing a supplementary angle;

Figure 8:
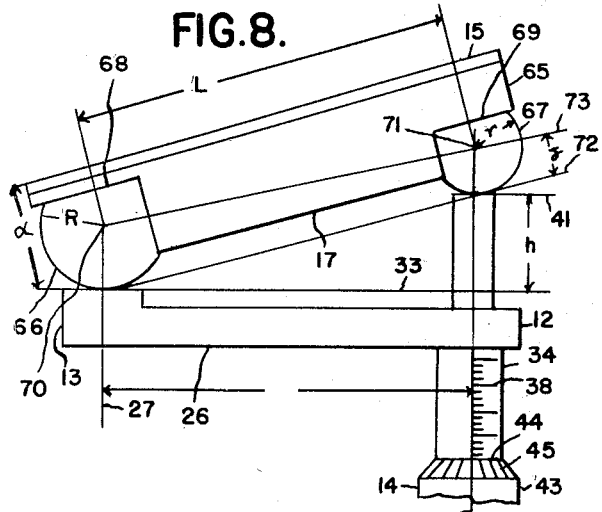
Fig. 8 is a front elevation of a micrometer of the second type.

As shown in Figures 1 to 3, inclusive, the complete instrument consists of four elements viz., a relatively movable angle measuring bar 11, a base bar 12, an anvil 13 and the micrometer proper 14.

The said bar 11 comprises a measuring plane 15, two curvilinear cylindrical cams 16 interconnected by means of a cam blade 17, two curved clamping grooves 18, one in each cam and running parallel with respect to the cam curves 19.

The said cam curves 19 will be more fully described in connection with the Figures 6 and 7, but at this juncture it may be mentioned that they are composite curves each consisting of two involute segments tangentially merging one into the other. The axes of the said cams 16 are denoted with the symbol $b$, the distance between the said axes being what I call the "base length" hereinafter denoted by L.

The evolutes of the said involute arcs are two pairs of concentric and also mutually tangent base circles drawn from the corresponding centers 20 and 21 and having two points of tangency 22 and 23, respectively, at which the large and the small base circles 24 and 25 touch each other.

The base bar 12 comprises a lower measuring plane 26, two parallel axes 27 and 28 erected upon the said plane perpendicularly, two vertically extending projections 29 at the left end of the said bar and two concentric threaded holes 30 in the said projections. The object of the said projections is to form a U-shaped slot into which the cams 16 snugly fit whereby the two bars 11 and 12 are held in a coplanar position at various angles of inclination and also may be clamped together in any such position by means of two set screws (not shown) engaging the corresponding threaded holes 30 to form a semi-permanent angle gauge.

The anvil 13 is a cylindrical button concentric with the said axis 27 and having a shank which tightly fits into a corresponding bore 31 formed in the bar 12. The said anvil is further provided with a plane measuring face 32 lying in the plane 33, the "zero" plane of the instrument.

The micrometer 14 is of the familiar design and comprises a barrel 34 having a flange 35 at its upper end, an internal bearing 37 next to the flange, an outer vertical scale 38 next to the said bearing, a vernier 39 side by side with the said scale and an internal thread 36 at its other end. The rotatable part of the said micrometer comprises a screw 42, an integral spindle 41, a ratchet knob 46 at the end of the said screw and a measuring plane surface 47 lying in the plane 48 at the end of the spindle.

The thimble 43 envelops the said barrel 34 and is rigidly attached to the screw 42 at its lower end. The top end of the thimble is beveled off into a sharp edge 44 upon which the "minute" graduations 45 are equispaced all about the circumference.

It is necessary that the entire micrometer assembly should be concentric with the axis 28, i. e. perpendicular to the measuring plane 26 of the lower bar 12.

Figure 2 is a side view of Figure 1 as looked upon from its small or left end. The side planes 49 of the members 11 and 12 are ground "flush" to a width W in excess of the diameter of the thimble 43 or the projections 29 whereby the instrument may be laid down upon a plane surface at its either side without interference. The cam grooves 18 register with the threaded holes 30 as shown in the drawing.

In Figure 3 the arrangement of the graduations of the barrel and thimble is shown in a typical example and at an enlarged scale. It is assumed in that particular instance that four full revolutions of the thimble are equivalent to one degree displacement of the upper bar 11. Hence, the larger graduation marks $k$ denote degrees and the intervening subgraduations $p$ denote quarter degrees or intervals of 15 minutes each. The screw is right-handed and upon rotating the same in the direction of the horizontal arrow 50, the marking edge 44 traverses the scale 38 in the direction of the upwardly pointing arrow 51. The circumference of thimble is divided into 15 equal parts by means of the marks 45, each interval obviously corresponding to one minute. The vernier marks 39 enable one to read off further subdivisions, usually in tenths of a minute.

An example will be given to demonstrate the use of the said scales. As shown in Figure 3, the edge 44 has just covered up the division corresponding to 5°30′ of the vertical scale 48. At the same time, the thimble graduation No. 7 is aligned with the 0 line of the vernier. Hence, the angle is 5°37′. Were the thimble turned to the left a very slight amount until the vernier mark No. 9 were aligned with the nearest thimble graduation No. 8, the angle would be equal to 5°36.9′.

To illustrate further, the range of measurement in the design shown in Figure 3 extends from 0 to 10 deg., inclusive, for a total of 6000 possible readings, i. e. all angles one-tenth of a minute apart. The screw has the customary 40 threads to the inch and one inch maximum travel. Under these circumstances, the base length $a'' + a'$ of the bar, see Figure 1, is equal to 5.7296″. This shows that the instrument is extremely sensitive, considering its relatively small size.

Figure 5:
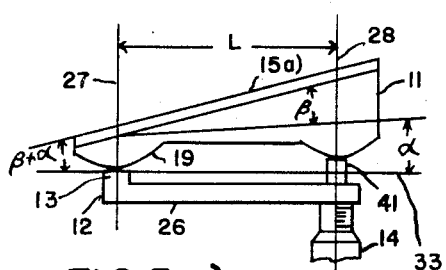
Figs. 5a and 5b are diagrammatic views showing the method of employing said supplementary angles.
Figure 5:
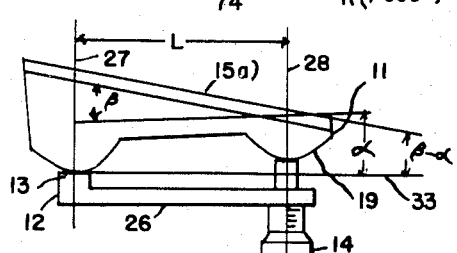

The method of extending the above mentioned relatively limited range of measurement is illustrated in Figures 4, 5a and 5b.

The practical difficulty encountered in any precision measurement involving a measuring screw is that unless the screw member be made relatively short, it will be inaccurate due to the cumulative nature of error peculiar to the said method.

In Figure 4 a modification of the arrangement shown in Figure 1 is shown. The measuring plane 15a is inclined with respect to the plane 26 of the base bar 12 at an initial or supplementary angle $\beta$ wherefore if the total range of the instrument having a horizontal measuring plane (as in Figure 1) were from 0 to $a_{max}$ degrees then, other things being equal, the instrument shown in Figure 4 will have a range extending from $\beta$ to $\beta + a_{max}$ degrees. Obviously, a number of such incremented and interchangeable bars is readily constructed having angular increments arranged in the following arithmetical progressions $$\beta = 0, a_{max}, 2a_{max}, 3a_{max}, \text{etc.} \quad (1)$$

By this means the range of measurement may be increased at will and a complete "set" will consist of a base bar 12, an anvil 13, a microscrew 14 and a plurality of $\beta$ bars, progressively incremented.

Incidentally, Figure 4 also shows a modified means of aligning and fastening together the upper and lower bars 11 and 12 in a plane. The said upper bar is provided with a tongue 52 which extends downwardly near the lower measuring plane 26 in a centrally extending slot 53 formed in the lower bar 12. Two symmetrically disposed guide curves 54 enveloping the clamping bolt 55 are formed at the bottom portion of the said tongue to form a V-shaped slot while the coplanar alignment of the members is obtained by means of two upwardly extending projections 29a integrally formed in the bar 12 around the said slot. The guide curves 54 assist the operator in correctly placing the cam curves 19 over the anvil 13 and spindle 41.

In Figure 5a the bar 11 containing an initial built-in angle $\beta$ is shown in what might be termed additive or positive method of assembly. Thus e. g. if the value of the angle $\beta$ is equal to 20 deg. and $a$ is equal to the previously mentioned angle 5°37′ (see Figure 3) the total angle will be 20 + 5°37′ = 25°37′.

In Figure 5b the upper bar is turned around 180 degrees with respect to Figure 5a. The method of assembly now is subtractive or negative and the resulting angle is equal to $$5°37' - 20° = -14° 23'$$

It is interesting to note in this connection that if the sign of the angle is ignored, any angle may be composed in two substantially different manners. Conversely, if the operator is sufficiently skilled in reading the graduations in the barrel and thimble, see Figure 3, both directly and also for complementary angles then, every other bar enumerated in the series Equation 1 may be omitted and yet, all angles within the range may be constructed. Some angles will be constructed additively and others subtractively. E. g. if $a_{max} = 10°$ and every other bar, i. e. every odd numbered bar is omitted in the Equation 1, the new series will be $$\beta' = 0, 2a_{max}, 4a_{max}, \text{etc.}$$
or $\quad (2)$
$$\beta' = 0°, 20°, 40°$$

and a total angle range say 0 to 50 deg. may be obtained by means of three replaceable bars only.

The theory of the involute type rectifying bar will now be briefly explained.

Figure 6:
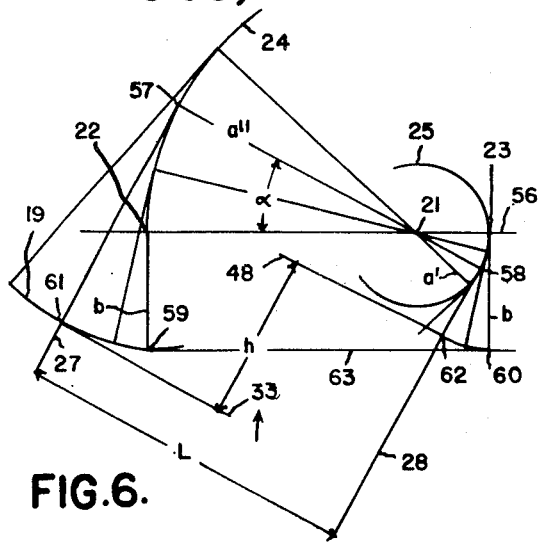
Figs. 6 and 7 are geometrical diagrams explanatory of the theory.

In Figure 6 a reference line 56 which may represent the measuring plane 15, Figure 1 or any other plane parallel to the same, is first drawn and from its point 21 as a center the larger base circle 24 having a radius $a''$ and a smaller such circle 25 having a radius $a'$ are struck. In this diagram the bar, i. e. the line 56, is considered to be held fast in the plane of the paper while the axes 27 and 28 denoting the relative positions of the anvil and microspindle are rotated clockwise through an angle $a$. Thus, the "diameter" 57—58, which does not change its length during the rotation, and this is important, determines the momentary direction of the anvil plane 33 and the spindle plane 48. The perpendicular difference $h$ between these two planes corresponds to the reading obtained in the barrel and thimble of the micrometer.

It will now be shown that if the two cooperating cam curves 59—61 and 60—62 are involutes developed from the corresponding base circles 24 and 25 in such a manner that they both possess an equal initial chord $b$ (the cam axes) disposed at right angles with respect to the first reference line 56 and the initial tangent plane 63 and if, the larger such involute extends outwardly and the smaller one inwardly of the measuring bar then: the shortest distance $h$ between the last two tangents 33 and 48 will be proportional to the angle $a$ and the shortest distance between the last two normals 57—61 and 58—62 will be a constant L, the base length of the bar.

The said two normals are obviously perpendicular to the diameter 57—58 and hence, they are parallel to each other, the distance between the two being 57—58=L. The tangents 33 and 48, obviously again, are perpendicular to the said normals and hence, are parallel to each other and the line 57—58. Hence:

$$h = \text{dist. } 57\text{—}61 - \text{dist. } 58\text{—}62 \quad (3)$$

But, $$\text{dist. } 57\text{—}61 = b + a''a \quad (4)$$
$$\text{dist. } 58\text{—}62 = b - a'a \quad (5)$$
$$h = (a'' + a')a = La \quad Q.\ E.\ D. \quad (6)$$

I shall now determine the relationship between the distances $p$ and $k$, Figure 3 and the base length L. Let $n$ be the number of turns of the micrometer screw 42 required to produce the elevation of the right end of the bar 11 through a height $k$ and equivalent to an angular displacement $a$ equals one degree. The pitch or lead of the screw is denoted with $p$ as already stated.

$$np = k \quad (7)$$

I now substitute in the Equation 6 $k$ for $h$ and the value of one degree in radians for $a$:

$$k = \frac{\pi}{180}L \quad Q.\ E.\ D. \quad (8)$$

The value of $n$ is an integer such as 1, 2, 3 etc. Assuming that a standard U. S. microscrew is employed, the useful length of which is one inch and it has 40 threads in that inch, then:

$$p = \frac{1}{40} = .025'' \quad (9)$$

from which and the Equation 8 I have:

$$L = \frac{180}{\pi}k = \frac{180}{\pi}np = \frac{4.5}{\pi}n \quad (10)$$

and the maximum range $a_{max}$ of the instrument is:

$$\alpha_{max} = \frac{40}{n} \text{ degrees} \quad (11)$$

From the above explanation it will appear that this system of angle micro-measuring is also readily applicable to the metric system of measurement as well as to measuring angles in radians instead of degrees and minutes. In fact, the measurement in radians is even simpler in that the irrational number $\pi$ seen in the Equations 8 and 10 cancels out permitting the base length L to be selected as a rational and, usually, a round number. Thus, e. g. if the problem were to construct an instrument in which the range is equal to one-tenth of a radian (5.7296°) for each one inch travel of the screw, the answer is immediately obtained from the Equation 6 by substituting $h=1$ and $$\alpha = \frac{1}{10}$$

$$1 = \frac{L}{10} \text{ and } L = 10'' \quad (12)$$

Figure 7:
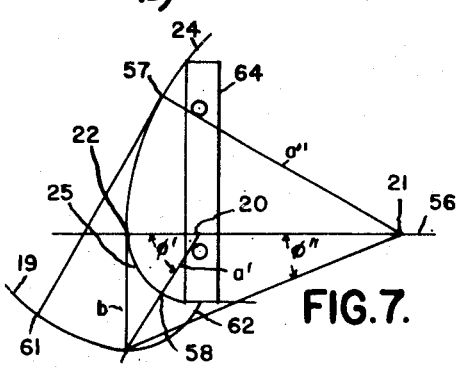

In Figure 7, the cam curve 19 consists of two involute arcs 61—59 and 59—62, respectively, which are tangent to each other at the point of junction 59 and in the cam axis $b$. At that point, the said two curves have not only a common tangent but also a common radius of curvature $b$ thus showing a mathematical continuity of second order. The evolute of the said cam curve is also a composite curve consisting of an upper circular arc 57—22 having a radius $a''$ and a center 21 and a lower similar arc 22—58 having a radius $a'$ and a center 20. The point of tangency is at the point 22, the point of intersection of the axes 56 and $b$. The continuity of the evolute is only of the first order inasmuch as the radii of curvature instantly change in value at the said point 22.

The said evolute may be made to form a grinding templet 64 as illustrated in which case the cam curve 61—59—62 may be swept by means of the point 58 in a single sweep when the generator 57—58 is rolled without sliding over the templet curve 57—22—62. This process may be used to generate the profile e. g. in a grinding wheel with which the cams 16 are ground.

One object of the said twin involute 61—59—62 is to make the angle bar 11 reversible whereby the supplementary angle methods shown in Figures 5a and 5b may be practiced.

Another object is to so select the particular values $a'$ and $a''$ (by keeping their sum a constant L in conformance with the Equation 6) that the structural height of the bar 11 may be kept at a minimum whereby the accuracy of the instrument is enhanced.

A third object is to employ a composite instead of a simple cam curve for the purpose of reducing the total variation of the pressure angle $\phi$ from one end of the curve to the other, by one-half. Thus, e. g. beginning at the point 62, the small end of the small involute, let the pressure angle there be 15 deg. By following the curve from there to the junction point 61 the pressure angle steadily increases and reaches the maximum value $\phi'=30°$. At that point, however, the larger involute 61—58 takes over and the pressure angle becomes again 15 deg. i. e. $\phi''=15°$. At the end point 58 the pressure angle has again increased to 30 deg. I performed certain calculations (which will not be repeated here) and have found that in order to obtain the above described specific changes in the momentary pressure angle, the values $a'$, $a''$ and $b$ should be selected as follows:

$$\left. \begin{array}{l} a' = .32L \\ a'' = .68L \\ b = .18L \end{array} \right\} \quad (13)$$

The second member in the Equation 6 indicates that only the sum of the two base radii $a''$ and $a'$ is a factor. Hence, one of the said values may be selected. If such a selection be made to the effect that e. g. $a'=0$, the smaller involute 60—62, Figure 6, will degenerate into a circle having a radius $b$. If on the other hand, the selection is $a'=a''$, then the two base centers 20 and 21, Figure 1, will coincide and the four base circles will merge into a single one. These specifics were more fully discussed and illustrated in the copending application mentioned in the preamble.

The second modification

In Figure 8 an angle measuring micrometer is shown in which an angle bar 65 of a novel type is used. This bar has the curious property that while it has the outer appearance reminiscent of the well known sine bar yet, it is actually an angle rectifying or radian bar similar in function and principle to the previously described bar 11, Figure 1.

The lower structure of the instrument comprising the base bar 12, the anvil 13 and the micro-screw 14 is, or may be, exactly the same as the one already described.

The angle bar 65 comprises at its upper portion a measuring plane 15 which is exactly parallel to the lower tangent plane 72 of the rollers. The said plane 15 is integral with a downwardly extending rib or blade 17 of a narrower width. The said blade is cut out at its two ends into two rectangular recesses 68 and 69 into which the mutilated circular rollers 66 and 67 having the corresponding larger and smaller radii R and $\gamma$, fit exactly. The line 73 connecting the roller axes 70 and 71 forms an acute angle $\delta$ with the base plane 72 and the measuring plane 15.

The principle of this bar is based upon a mathematical approximation which I believe I was the first to discover. In that approximation I obtain the corrective element needed for the rectification of the angle to be measured by selecting the supporting rollers to be of different diameters determined in a certain manner or more broadly by offsetting the measuring plane from the plane passing through the axes of the said cylinders at an angle $\delta$.

Figure 9:
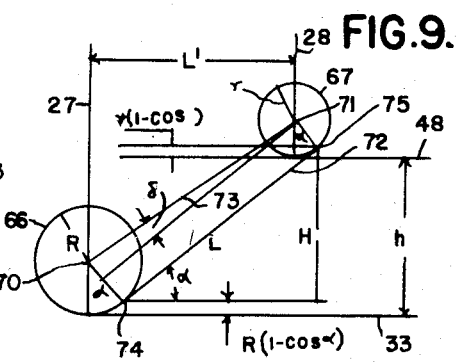
Fig. 9 is a geometrical diagram explanatory of the theory of the instrument shown in Figure 8.

In Figure 9, the cylinders 66 and 67 have a common tangent plane 72 and the length of the intercept between the points of tangency 74 and 75 is made to equal L, the base length of the proposed rectifying bar, which in this design is equal to the projection of the center distance 70—71 upon the measuring plane 15, see Figure 9, i. e. it is always less than the said distance, which is new. The smaller cylinder 67 is now raised until the tangent plane L includes the angle $\alpha$ with the horizontal. In this new position two horizontal tangents 33 and 48 are drawn to the said circles 66 and 67, respectively, at their downwardly facing sides. The height difference between the two last said tangents is denoted with $h$. The maximum tilting angle usually ten degrees, is denoted with $\alpha$, hence from the Equation 6:

$$h = L\alpha \qquad (14)$$

i. e. the bar will be absolutely correct in rectifying the angles in the initial (zero) and end ($\alpha$) positions, but will show a slight error in between, see Equations 25 and 26. But from the diagram, another geometrical relationship involving $h$ may be written down by inspection in the following manner:

$$h + \gamma(1 - \cos \alpha) = H + R(1 - \cos \alpha) \qquad (15)$$

but:

$$H = L \sin \alpha \qquad (16)$$

$$h = L \sin \alpha + (R - \gamma)(1 - \cos \alpha) \qquad (17)$$

I now combine the Equations 14 and 17

$$L\alpha = L \sin \alpha + (R - \gamma)(1 - \cos \alpha) \qquad (18)$$

After arranging, I have:

$$\frac{(\alpha - \sin \alpha)}{1 - \cos \alpha} = \frac{R - \gamma}{L} = C \qquad (19)$$

Equation 19 may be used to determine the constant C at the right side to correspond to any assumed value of $\alpha$. I discovered that if the range of the measurement is equal to say 10 deg. as was previously explained and if I calculate the constant C on the basis of the maximum angle in the range i. e. $\alpha = 10$ deg. then, all the intervening angles will be satisfied by that same constant to within one-hundredth of one percent, which is quite good enough for any micrometer. Thus, I substitute the values from the trigonometrical tables for $\alpha = 10°$ in the Equation 19

$$C = \frac{.17453 - 17365}{.01519} = \frac{.00088}{.01519} = .05800 \qquad (20)$$

The roller diameters and the angle $\delta$ may now be determined. It is seen from the Equation 19 that the difference of the radii $R - \gamma$ is constant. Hence:

$$R - \gamma = .0580L \qquad \text{Q. E. D.} \qquad (21)$$

$$\tan \delta = \frac{R - \gamma}{L} = .0580 \qquad (22)$$

$$\delta = 3° 19' \qquad \text{Q. E. D.} \qquad (23)$$

in which L is obtained from the Equation 10:

$$L = \frac{180}{\pi} k \qquad (24)$$

The angular error may be calculated from the Equation 19. By rearranging the said equation somewhat, it may be written $$(\alpha - \sin \alpha) - .0580(1 - \cos \alpha) = 0 = ? \qquad (25)$$

I have put a question mark at the right side of the equation to indicate that there will not be a complete agreement unless $\alpha = 10°$ or $\alpha = 0$. The difference from zero is actually the angular error $\Delta\alpha$ as it can be proved. I shall now calculate the error for $\alpha = 5°$ using again the trigonometric tables:

$$\Delta\alpha = (.08727 - .08716) - $$
$$.0580 \times .00380 = -.00011 \qquad (26)$$

Hence the error is .00011 radians or .00011″ per inch or again 0° 0′ 22″. All the errors are on the negative side which gives another opportunity to reduce them still further by slightly correcting either the length L or the radius R in order to strike a "mean" line among the errors. The maximum error occurs at 6° 40′ and is equal to —.00013. As is seen in Figure 9, the projection L′ of the base length L upon the horizontal plane 33 shows a slight discrepancy which, however, is insignificant in that the anvil 13, Figure 8, is wide enough to accommodate the slight variation of the distance between the axes 27 and 28. The maximum variation may be calculated from the relation found in Figure 9:

$$L' = L \cos \alpha + (R - \gamma) \sin \alpha \qquad (27)$$

for $\alpha = 10°$, I find that:

$$L' = .995L \qquad (28)$$

Figure 10:
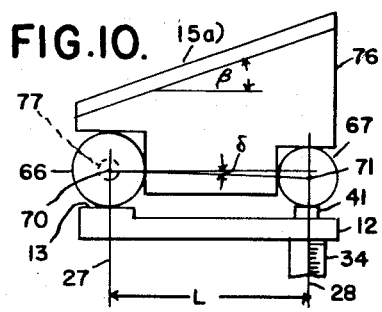
Fig. 10 is a modification of Fig. 8 showing a supplementary angle.

Figure 10 shows a measuring bar 76 which is similar in all respects to the bar 65 shown in Figure 8 and previously described except that the measuring plane 15a shows a supplemental initial angle $\beta$. It is to be noted however that in this design the larger of the two rolls 66 must be placed at the anvil, hence the bar cannot be turned around as could the double-acting bar shown in Fig. 5b. The said roll 66 may be, obviously, replaced by means of a stationary pivot of any desired diameter whatever as indicated by the dotted circle 77, providing however that the center distance 70—71 includes the angle δ with the datum line as already explained.

What I claim as my invention is:

1. A rectifying bar comprising a measuring plane and two cylinders having parallel axes at the ends of the said plane, in which the angle included by the said first plane and the plane of the said axes is acute corresponding to a predetermined range to which the said bar may be tilted with respect to a relatively fixed base plane and in which the mathematical relationship is such that the said angle is a mathematical function of the said range angle and approximately equals one third of the said range.

2. A rectifying bar comprising a measuring plane and two cylinders having parallel axes and supporting the said plane at its two ends, in which the angle included by the said plane and the plane of the said axes is acute and is a function of a predetermined range angle through which the angles are being rectified, in which the projected shortest distance of the said axes upon the said first plane is equal to the displacement corresponding to one degree of the range multiplied by $$\frac{180}{\pi}$$

and in which the diameters of the said cylinders are unequal and are so selected that their common tangent plane drawn oppositely to the said measuring plane is parallel to the said plane.

3. An angle measuring instrument comprising two bars each having a measuring plane and capable of forming any angle within a predetermined range by tilting one bar with respect to the other in a plane, in which the first bar is of the rectifying kind comprising a datum plane, two parallel cylinders, the axes of which are disposed at an initial angle formed by the said datum plane and the plane of the axes of the said cylinders, in which the said movable plane is operated by means of a micrometer screw having a constant lead of helix and in which the mathematical relation is such that the said angle is a function of the range angle and roughly corresponds to one third of the range angle of the instrument and the projected distance of the said axes upon the said datum plane when multiplied by $$\frac{\pi}{180}$$

is an integral multiple of the said lead of helix.

4. An angle measuring instrument comprising two bars each having a measuring plane and capable of forming any angle within a predetermined range by tilting one bar with respect to the other in a plane, in which the first bar is of the rectifying kind comprising a datum plane, two parallel cylinders and a corrected distance of the said cylinders and the second bar comprises a stationary and a movable plane contacting the said cylinders, in which the said movable plane is operated by means of a micrometer screw having a constant lead of helix and in which the mathematical relation is such that the length of the said distance is proportional to the said lead of helix and forms a predetermined small angle with the measuring plane of the said first bar.

5. An angle measuring instrument comprising a relatively movable rectifying bar and a relatively stationary bar comprising an anvil and a movable plane operated by means of a micrometer screw of constant pitch, in which the said first bar comprises a measuring plane having an operating length and two cylinders supporting the said plane and in which the arrangement is such that the plane drawn through the corresponding axes of the said cylinders forms an acute angle with respect to the said measuring plane in a zero position, in which the said angle is a function of the angle of maximum range of the instrument in which the said length when multiplied by $$\frac{\pi}{180}$$

forms a rational number and a multiple of the said lead of helix and is equal to the projected distance of the said axes upon the said plane.

6. An angle measuring device comprising two relatively movable bars capable of forming all angles within a predetermined range, in which one of the bars comprises an anvil and a micrometer and the other one comprises at its ends two cylinders having parallel axes and contacting the said anvil and tip of the micrometer respectively, in which the arrangement is such that the plane comprising the said axes forms an acute angle with respect to the said bars when in zero position and converges in the direction taken from the said anvil toward the said micrometer, in which the said angle is mathematically determined from the said range and in which the distance of the said axes is also calculated from the said angle, range and the pitch of the screw of the said micrometer to obtain a constant ratio of rotation between the said bars and the micrometer screw within the said range.

NIKOLA TRBOJEVICH.

References Cited in the file of this patent

UNITED STATES PATENTS

| Number | Name | Date |
|---|---|---|
| 1,374,759 | Noddings | Apr. 12, 1921 |
| 2,173,519 | Jones | Sept. 19, 1939 |
| 2,351,773 | Lovenston | June 20, 1944 |
| 2,417,150 | Berry | Mar. 11, 1947 |
| 2,446,562 | Trbojevich | Aug. 10, 1948 |
| 2,505,928 | Worby | May 2, 1950 |
| 2,511,443 | McDowell | June 13, 1950 |

FOREIGN PATENTS

| Number | Country | Date |
|---|---|---|
| 18,856 | England | 1912 |

OTHER REFERENCES

American Machinist, May 21, 1931, pp. 801 and 802.